Nov. 8, 1960  R. G. BERFIELD  2,959,675
AUTOMATIC GAIN CONTROL
Filed Oct. 1, 1957

INVENTOR.
ROBERT G. BERFIELD
BY
Harry M. Saragovitz
Attorney

United States Patent Office 2,959,675
Patented Nov. 8, 1960

2,959,675

AUTOMATIC GAIN CONTROL

Robert G. Berfield, Canoga Park, Calif., assignor to the United States of America as represented by the Secretary of the Army Filed Oct. 1, 1957, Ser. No. 687,854

5 Claims. (Cl. 250—20)

This invention relates to an automatic gain control for a radar receiver used in the reception of the microsecond pulses of high frequency energy.

In tracking a mobile transmitter by radar, a pulse of high frequency energy is transmitted from a radar transmitter at a tracking station and received by the mobile receiver. This signal triggers the mobile transmitter into activity and it sends out a response signal consisting of microsecond pulses of high frequency energy that is picked up at a tracking station by a radar receiver. Instability of the mobile transmitter causes drifts in frequency of the output, necessitating the continuous tuning of the radar receiver for the maintenance of contact therebetween. Frequency control systems for tuning the receiver in response to changes in frequency of the mobile transmitter require the concurrent maintenance of a constant amplitude input to the frequency control system.

The present invention is for the purpose of solving problems presented in pulse type radar receivers in providing for a constant amplitude input to the frequency control system.

As in a common automatic gain control used in commercial receivers gain control voltages are derived from the signal voltage. A D.-C. voltage is obtained by rectifying and amplifying the input signal. This voltage varies with the strength of the input signal and is used to control the gain of the amplifier in a manner to counteract the change in the signal strength.

In radar receivers receiving signals that are pulses, usually single pulses from a particular source, there is a low average of signal strength because the time that the signal is present is very short compared with the time interval when there is no signal. This presents a demand for a greater amount of amplification than is required in commercial receiver to obtain a gain control voltage of adequate strength. The present invention is for the purpose of providing an automatic gain control for pulse type receivers to minimize this need for amplification.

An object of the invention is to provide an automatic gain control for pulse type receivers.

Another object of the invention is to provide an automatic gain control for a pulse type radar receiver.

Still another object of the invention is to provide an automatic gain control having high gain and good stability for radar receivers.

Other objects of the invention will become obvious from a consideration of the specification, claims and drawings in which:

Figure 1:
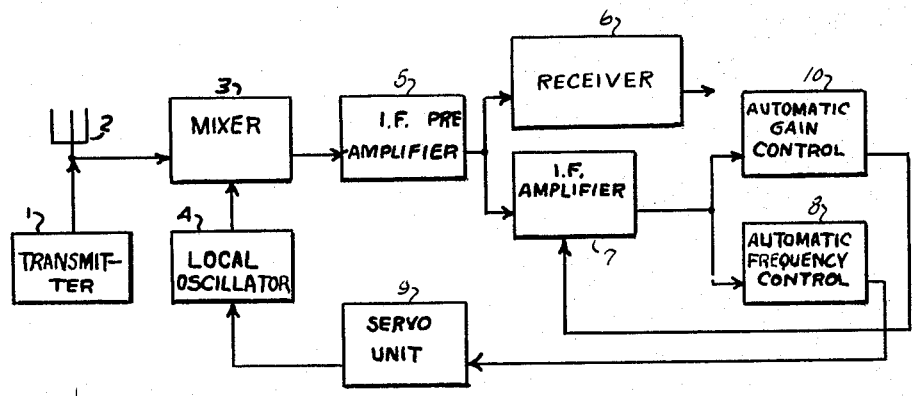
Fig. 1 is a block diagram of a radar receiver showing the environment of the invention.

The invention disclosed herein finds its particular utility in a receiver equipment of the character illustrated in Fig. 1. The receiver equipment is associated with a transmitter of pulses of high frequency energy as in a radar system. A transmitter 1 transmits a pulse of high frequency energy at regular intervals through the antenna 2 to a mobile receiver (not shown). The mobile receiver operates to trigger a mobile transmitter (not shown) which, when activated, transmits a microsecond pulse of high frequency energy for every pulse received. The antenna 2 picks up this signal from the mobile transmitter and the associated circuits of the tracking station feed it to the mixer 3 where it is mixed with the output of the local oscillator 4. The frequency of the local oscillator 4 is such that when its output is combined with the input signal to the mixer 3, a signal having an intermediate frequency is produced. The intermediate frequency preamplifier 5 is tuned to a fixed frequency and its input must be maintained at substantially the fixed frequency. For this purpose, the oscillator 4 must be continually tuned to adjust its output frequency so that when combined with the input signal to the mixer 3, the input to the preamplifier 5 will be maintained constant.

The output of the mixer 3 is fed through the intermediate frequency preamplifier 5 to an intermediate frequency amplifier 7 having means for controlling the gain thereof. The output of the intermediate frequency amplifier 5 is also connected to a receiver 6 wherein the signal is used for its intended purpose. The receiver 6 may have its own automatic gain control means which is of the type best suited to its design.

From the amplifier 7 a signal is fed to the automatic frequency control 8 where a voltage is developed which, when fed through a servo unit 9, controls the frequency of the local oscillator 4. The frequency of the input signal supplied to the automatic frequency control 8 operates therein to control the generation of a voltage at its output, which, when fed through the servo unit 9, controls the output of the local oscillator 4. The control imposed on the local oscillator 4 is such that its output frequency is altered in a direction as to counteract the change in frequency of the input signal supplied to the automatic frequency control 8. The automatic frequency control 8 comprises a discriminator which responds not only to frequency variations of the input signal thereto but also responds to the amplitude of the input signal thereto. To eliminate the response effect related to amplitude changes, requires that the amplitude of the input signal supplied to the automatic frequency control 8 be maintained constant. For this purpose an automatic gain control means 10 receives an output signal from the intermediate frequency amplifier 7 and generates a voltage which is fed back to the intermediate frequency amplifier 7 for controlling the gain thereof to counteract tendencies of the output of the amplifier 7 to change in amplitude with changes of signal strength.

Figure 2:
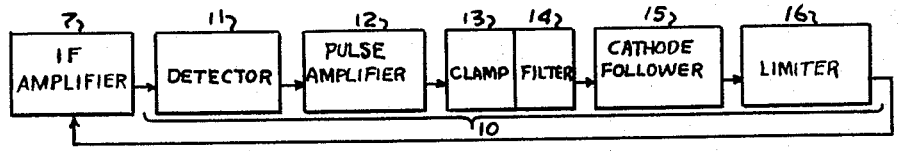
Fig. 2 is a block diagram of an automatic gain control system according to the present invention.

The automatic gain control 10 is further shown in Fig. 2 as connected to the intermediate frequency amplifier 7, illustrates generally the particular elements of the gain control means 10 and the sequence of functions performed thereby. The intermediate frequency amplifier 7 feeds a signal to the detector 11 wherein the pulse of intermediate frequency energy is converted to a D.-C. pulse. The output of the detector 11 is amplified in the pulse amplifier 12 to an amplitude adequate for gain control. From the pulse amplifier 12 the D.-C. pulse is fed to a clamping circuit 13 wherein the peak of the D.-C. pulse is clamped to a predetermined and adjustable level. The output of the clamping circuit is filtered in the filter 14 to produce a continuous D.-C. voltage having an average value substantially that required for control of the gain. The output of the filter circuit 14 is fed to the control grid of a cathode follower 15 wherein the required voltage is obtained. This voltage is fed through a limiting means 16 to the intermediate frequency amplifier 7 for controlling the gain thereof.

Figure 3:
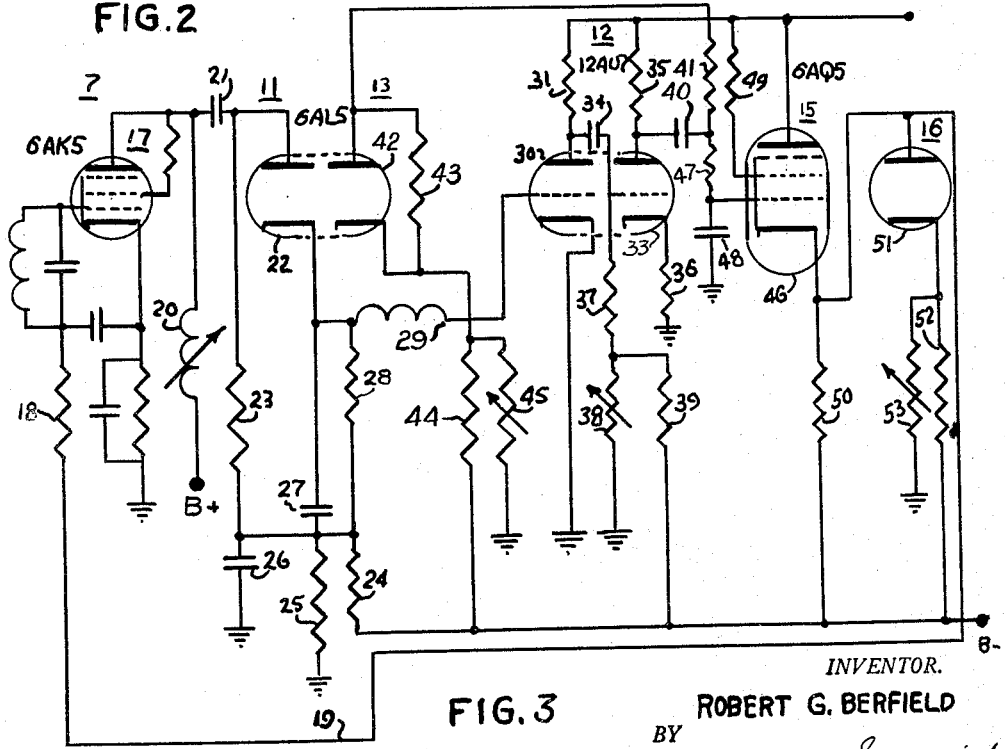
Fig. 3 is a circuit diagram of the automatic gain control according to the present invention.

A more complete and detailed disclosure of the automatic gain control 10 is shown in Fig. 3. The last stage 17 of the intermediate frequency amplifier 7 is shown having a fixedly tuned input with a grid bias resistor 18 connected to the gain control loop 19. The voltage of the loop 19 determines the gain control to be effected to counteract changes in signal strength at the output of the amplifier 7 to maintain the output of the intermediate frequency amplifier 7 constant in amplitude.

The plate circuit of the amplifier 17 is connected to a source of plate potential through a variable intermediate frequency choke 20 which blocks the intermediate frequency that is coupled through the capacitor 21 to the diode tube 22. The plate of the tube 22 is further connected to a source of negative potential through resistor 23 and resistor 24 and to ground through the resistor 23 and resistor 25. The capacitor 26 shunts the resistor 25. In the absence of a pulse voltage supplied through capacitor 21, the diode 22 is nonconductive, as the cathode and plate are then at the same potential. When a pulse is transmitted through capacitor 21 the plate swings positive relative to the cathode in the tube 22 and it conducts for the duration of the pulse. The cathode of the tube 22 is connected to the source of negative potential through the resistors 28 and 24 and to ground through the resistors 28 and 25. The resistor 28 is shunted by capacitor 27. The capacitors 26 and 27 provide low impedance paths to ground for the intermediate frequency. The cathode of the tube 22 is further connected through the intermediate frequency choke 29 to the control grid of the triode 30 functioning as the first stage of a pulse amplifier 12. The choke 29 permits the D.-C. voltage pulses to pass to the grid but bars the passage of the intermediate frequency which is by-passed to ground through the capacitor 27 and capacitor 26.

The tube 30 has its plate connected through a plate load resistor 31 to a source of positive plate potential and its cathode connected directly to ground. The plate of the tube 30 is further connected to the grid of the triode 33 through the coupling capacitor 34. The tube 33 functions as the second stage of the pulse amplifier 12. It has its plate circuit connected to the source of plate potential through the resistor 35 and its cathode connected to ground through the resistor 36. The grid of the tube 33 is further connected to ground through the resistors 37 and 38 and to a source of negative potential through the resistors 37 and 39. The resistor 38 is made variable whereby the bias on grid may be adjusted to vary the gain of the pulse amplifier 12. The output of the diode 22, when it conducts, is a positive D.C. pulse applied to the grid of tube 30. This causes the tube 30 to conduct for the duration of the D.C. pulse applied to its grid. When tube 30 conducts the voltage drops on its plate thus producing a negative voltage pulse which is applied to the grid of the tube 33. A negative voltage pulse applied to the grid of tube 33 causes the tube 33 to become less conductive and its plate voltage rises producing a positive pulse.

The plate of the triode tube 33 is further connected through the capacitor 40, resistor 41 to a clamping circuit comprising a parallel arranged diode 42 and high resistance 43. The cathode of the diode 42 is biased through resistor 44 connecting the cathode to a source of negative potential and through a resistor 45 connecting the cathode to ground. The resistor 45 is made variable for controlling the amount of the bias and the level of clamping. The diode 42 in the absence of a positive pulse supplied to its plate is normally nonconductive. While the tube 33 is nonconductive, as when its grid swings negative, the plate voltage of tube 33 raises to that equal to the source B+. During the continuance of the negative pulse on the grid, the tube 42 conducts and the capacitor 40 charges to a potential determined by the setting of the rheostat 45. The output potential during this same period remains at the clamped level or at reference level. When the voltage on the grid of tube 33 swings positive, the tube 33 begins to conduct and its plate potential substantially instantly drops to its lower level. The charge on the capacitor 40 cannot change, as the tube 42 becomes nonconductive and resistance 43 becomes effective. As a consequence, the change in potential of the plate of the tube 33 is coupled through the capacitor 40. As a further consequence, the short duration positive pulses of the tube 33 are converted to long duration negative pulses and an average voltage of greater magnitude is obtained.

The plate of the tube 33 is further connected to the control grid of the cathode follower tube 46 through the capacitor 40 and the resistor 47. A capacitor 48 connects the control grid of the cathode follower to ground. The resistor 47 and capacitor 48 constitute a filter in the input to the tube 46. The plate of the cathode follower is connected to a source of potential and has its screen grid connected to the same source through the resistor 49. The suppressor grid is connected to the cathode. The cathode of the tube 46 is connected through a load resistor 50 to a source of negative potential. The cathode of the tube 46 is connected to the gain control loop 19 for providing the gain control voltage. The filter 47, 48 irons out the negative variations of the voltage at the output of the clamping circuit and presents to the grid of the tube 46 a continuing negative potential which varies as the average of the potential variation at the output of the clamping circuits. As the potential on the grid of tube 46 becomes more negative, the potential on the cathode of tube 46 becomes more negative and the output to the gain control loop 19 becomes more negative.

As is often the case in automatic gain control systems, if the signal strength reduces to certain limits, the gain obtainable cannot offset the decrease in signal strength. For the protection of the circuits it is necessary to limit the range of operation of control of the automatic gain control. For this purpose the limiter 16 is provided at the output of the cathode follower 15.

The gain control loop 19 is also connected to the plate of a diode 51 which has its cathode biased at a certain potential through a resistor 52 connected to a source of negative potential and resistor 53 connected to ground. The resistor 53 is variable to permit the adjustment of the bias voltage on the cathode, for adjusting the maximum level to which the gain control voltages may be raised with decreasing signal strength.

In the operation of the gain control circuit, the intermediate frequency pulse signal is fed to the detector 11 wherein it is converted to a D.-C. pulse. The output of the detector 11 is fed to the pulse amplifier 12 wherein its amplitude is increased to the required value consistent with the requirements of the input of the cathode follower 15. The gain of the pulse amplifier 12 may be adjusted by the resistor 38.

The top of the pulses of the pulse amplifier is clamped to the level set by the resistor 45. The output of the clamper tube is then fed to the filter 47, 48 and coupled to the grid of the cathode follower tube 46. The output of the cathode follower 46 is fed to the gain control loop 19 from which the gain control is effected.

The principal feature of the invention is that advantage is taken of the long time duration between pulses for obtaining a high average voltage without the necessity of multiple amplification stages. After clamping the tops of the pulses to the level set by the resistor 45, the voltage between pulses is the correction voltage that is fed to the grid of the cathode follower 46.

If the amplitude of the signal at the output of the intermediate frequency amplifier 7 decreases, the amplitude of the pulses at the output of the pulse amplifier 12 also decreases. This produces an increase in the grid voltage and an increase in the gain control loop voltage for increasing the gain of the intermediate frequency amplifier 7. Conversely, should the amplitude of the signal at the output of the intermediate frequency amplifier 7 increase, the amplitude of the pulse at the output of the pulse amplifier 12 will also increase providing by reason of the clamping circuit a greater negative bias on the cathode follower 15 to reduce the voltage in the gain control loop 19 that operates to reduce the gain of the intermediate frequency amplifier 7 to maintain the output thereof at substantially constant amplitude.

The benefit of the invention is in the non-linear gain achieved in the clamper circuit 13 which minimizes the required number of circuits to obtain the necessary loop gain in the automatic gain control loop 19. This is possible due to the long time intervals between pulses.

While the invention is disclosed in relation to a specific application, it is capable of being utilized in other environments where there is a need for automatic gain control. Specific application is for the disclosure purposes alone and is not to be taken as limiting the invention.

Having described the invention and best mode of making and operating same, what I consider to be my invention is set forth in the following claims:

1. In a pulse type receiver system an automatic gain control comprising a gain controlled intermediate frequency amplifier, a detector connected to the output of the amplifier, a pulse amplifier connected to the output of said detector, a clamper circuit connected to said pulse amplifier for clamping the output thereof at substantially the maximum peak level thereof, a cathode follower connected to the output of the clamping circuit including a low pass filter in the input circuit for producing a continuous D.-C. gain control voltage varying inversely with the strength of the signal and means for controlling the gain of said amplifier in response to changes of said voltage.

2. In a pulse type receiver system adapted to receive a radio pulse of relatively short duration spaced comparably at long time intervals apart, and an automatic gain control system comprising an intermediate frequency amplifier having means for controlling the gain thereof, a detector connected to the output of said amplifier, a pulse amplifier connected to the output of said detector for producing an amplified D.-C. voltage pulse, a clamping circuit connected to the output circuit of said pulse amplifier having means for clamping the maximum peaks of said voltage pulses to a predetermined level of potential, a filter circuit connected to the output of the pulse amplifiers for providing a steady D.-C. potential proportional to the magnitude of the pulses, a cathode follower connected to the filter circuit for providing a continuous voltage source inversely varying with the changes of amplitude of the signal received from the intermediate frequency amplifier and means connecting the continuous voltage source to the intermediate frequency amplifiers to maintain a continuous control of the gain thereof.

3. In a pulse type receiver system comprising a mixer, a local oscillator for providing an alternating voltage of such frequency that when combined with the radio frequency signal will convert it to an intermediate frequency signal, an intermediate frequency pre-amplifier having a constant gain, a receiver connected to the output of said amplifier, an intermediate frequency gain control amplifier having means for controlling the gain thereof also connected to the output of the first intermediate frequency amplifier, means connected thereto for controlling the frequency of the local oscillator for maintaining the output of frequency of input constant and means connected thereto for controlling the gain of the intermediate frequency amplifier to maintain the output therefrom at a constant amplitude comprising means for rectifying the signal from the intermediate frequency amplifier, means for amplifying the output of the rectifying means, a means for clamping the peaks of said voltage pulses at an adjusted potential level substantially equal to the amplitudes of said peaks of said voltage pulses, a filter circuit for averaging out the pulses to produce a constant D.-C. voltage proportional to the average peak values of the pulses and means responsive to said voltage for controlling the gain of said amplifier.

4. An automatic gain control system for a pulse type receiver comprising an intermediate frequency amplifier having means for adjusting the gain thereof, means connected to the output of the amplifier for converting the intermediate frequency pulses to D.-C. voltage pulses, a D.-C. pulse amplifier connected to the last mentioned means, a clamping circuit means connected to the output of the pulse amplifiers for clamping the D.-C. pulses to a predetermined voltage level substantially equal to the peak value of said A.-C. pulses, and means responsive to the average peak value of said D.-C. pulses for producing a continuous voltage having a value which varies inversely with variations of signal strength and means utilizing this voltage for continuous controlling the gain of said intermediate frequency amplifier to maintain the pulse signals at the output thereof at a substantially constant amplitude.

5. A frequency control system responsive to the frequency of an input signal and for producing a voltage varying in relation to the variation of the frequency, said input signals consisting of spaced pulses of intermediate frequency energy, means for maintaining the input signals to said frequency control system at a constant level comprising an intermediate frequency amplifier for receiving the input signals and for feeding signals of constant amplitude to said first named means, said intemediate frequency amplifier having means for varying the gain thereof whereby said signals may be maintained at said constant amplitude, a detector also coupled to the output of said amplifier for converting said intermediate frequency pulses to D.-C. pulses, a D.-C. pulse amplifier coupled to said detector for amplifying said D.-C. pulses, a clamping circuit connected to the output of said D.-C. pulse amplifier for clamping the output thereof to a predetermined voltage level comparable to the maximum peak value of said D.-C. pulses whereby a negative voltage pulse is produced having comparable peak values and a duration equal to the interim between the intermediate frequency pulses, a cathode follower, a filter circuit coupling the output of said pulse amplifier and clamping circuit to said cathode follower, whereby to produce a continuous D.-C. voltage varying in accordance with the average of the negative pulse maximum voltage, means coupled to the output of said cathode follower for limiting the output thereof to a predetermined maximum value and means for feeding the output of said cathode follower to said intermediate frequency amplifier for exerting a continuous control over the gain of said amplifier.

References Cited in the file of this patent

UNITED STATES PATENTS

| | | |
|---|---|---|
| 2,082,187 | Stevens | June 1, 1937 |
| 2,241,553 | Kallmann et al. | May 13, 1941 |
| 2,329,570 | Wellenstein et al. | Sept. 14, 1943 |
| 2,569,289 | Clark | Sept. 25, 1951 |
| 2,743,355 | Sink | Apr. 24, 1956 |
| 2,777,055 | Goldenberg | Jan. 8, 1957 |
| 2,866,015 | Sailor | Dec. 23, 1958 |